Figure 1:
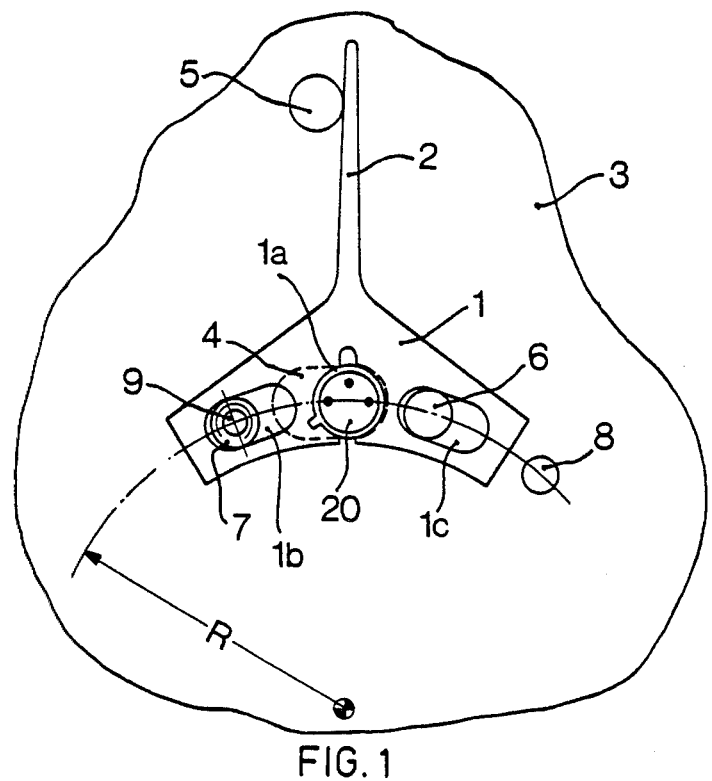

United States Patent [19]

Manzke et al.

[11] 4,297,736
[45] Oct. 27, 1981

[54] DEVICE FOR ADJUSTING AND FIXING DETECTING MEANS RELATIVE TO THE INDEX MARK ON A RECORDING DISC

[75] Inventors: Klaus Manzke, Westheim; Roland Brotzler, Hochdorf-Assenheim; Klaus Schulze-Berge, Ludwigshafen, all of Fed. Rep. of Germany

[73] Assignee: BASF Aktiengesellschaft, Fed. Rep. of Germany

[21] Appl. No.: 106,891

[22] Filed: Dec. 27, 1979

[30] Foreign Application Priority Data

Jan. 12, 1979 [DE] Fed. Rep. of Germany ... 7900696[U]

[51] Int. Cl.³ .................. G11B 7/08; G11B 17/00; G11B 3/86
[52] U.S. Cl. ........................ 360/109; 360/97; 360/133
[58] Field of Search .............. 360/109, 133, 97–99, 360/86, 135, 128; 346/131, 137; 250/202, 203 R, 548, 561, 570; 358/128; 74/525, 571 R; 206/444, 309

[56] References Cited

U.S. PATENT DOCUMENTS

| 3,668,658 | 6/1972 | Flores et al. | 360/133 |
| 3,990,111 | 11/1976 | Elliott | 360/99 |
| 4,003,092 | 1/1977 | Hirata | 360/109 |
| 4,065,798 | 12/1977 | Sugisaki et al. | 360/128 |

*Primary Examiner*—Alfred H. Eddleman
*Attorney, Agent, or Firm*—Keil & Witherspoon

[57] ABSTRACT

A device, provided on a recording/reproducing apparatus, for adjusting and fixing a detecting means relative to the index mark on a recording disc, which device comprises a holding device for the detecting means, the position of which can be altered and which can be aligned and fixed relative to the index mark, the holding device consisting of a slidably mounted member made of a suitable material and having at least one elongated hole, and of a spring which exerts a biassing force on the slidably mounted member which moves on an arcuate path.

3 Claims, 6 Drawing Figures

DEVICE FOR ADJUSTING AND FIXING DETECTING MEANS RELATIVE TO THE INDEX MARK ON A RECORDING DISC

The present invention relates to a device for adjusting and fixing an index-mark-detecting means relative to the index mark on a recording disc, which device is arranged on a recording/reproducing apparatus for the recording disc and comprises a holding device for a detecting means, the position of which can be altered and which can be aligned and fixed relative to the index mark on the disc.

A device of the said kind for apparatus for writing and reading flexible magnetic discs for data recording is known which comprises a holder for a phototransistor, the holder consisting of a displaceable slotted plastics member which can be positioned by pressing it up against a guiding edge on the apparatus and then fixed by tightening a screw on the apparatus.

Displacement and fastening of the holder are effected by hand using one or two tools; these operations are difficult to carry out because they cannot be effected delicately enough, and it is hardly possible to repeat them exactly.

It is an object of the invention to provide a device for the rapid, reliable and precise adjustment and fixing of the detecting means relative to the index mark on a recording disc.

We have found that this object is achieved with a device of the above-described type, wherein the holding device for the detecting means is a slidably mounted member which has at least one elongated hole and is spring-loaded against the chassis of the apparatus, said member moving on an arcuate path defined by the curved line passing centrally through the elongated hole and the middle of the detecting means.

In an advantageous embodiment of the invention, the holding member is provided with two elongated holes which are arranged symmetrically with respect to the detecting means.

In a further advantageous embodiment of the invention, the holding member is made of plastics material and is molded integrally with a spring in the form of an arm.

As a result, displacement of the holding member can be effected against the bias of the spring, it thus being possible to allow the detecting means, to be positioned, to slide back if its ideal position relative to the index mark is passed, without there being any need to switch the position of the adjustment tool or to employ a second adjustment tool. Rapid and very precise adjustment is possible because the holding member is urged up against the adjustment tool by the spring force, as a result of which slippage of the holding member is practically ruled out when the clamp screw is tightened after the detecting means has reached its ideal position.

The device of the invention makes the adjustment operation less dependent on the manual dexterity of the adjuster, which greatly reduces assembly costs. Moreover, low-cost quantity production of the device is made possible by its special design.

Figure 2:
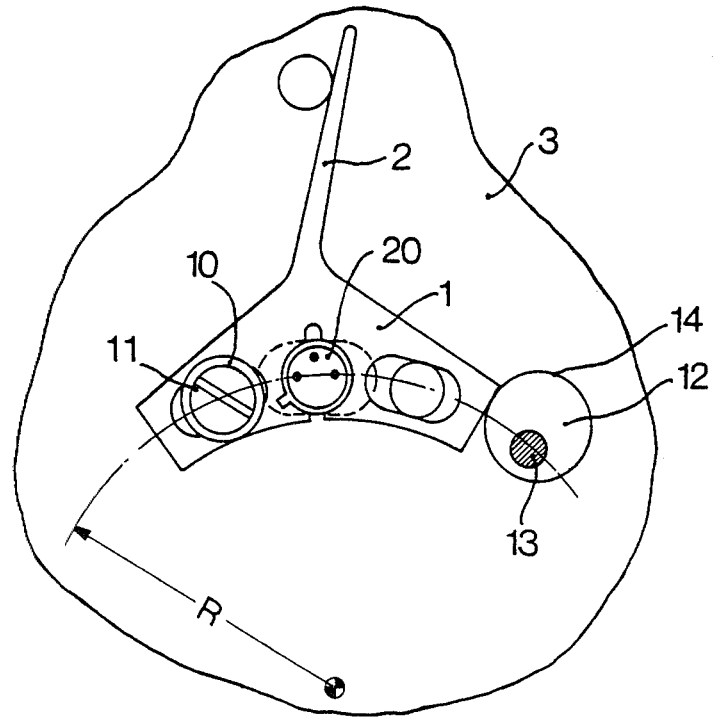
Figure 3:
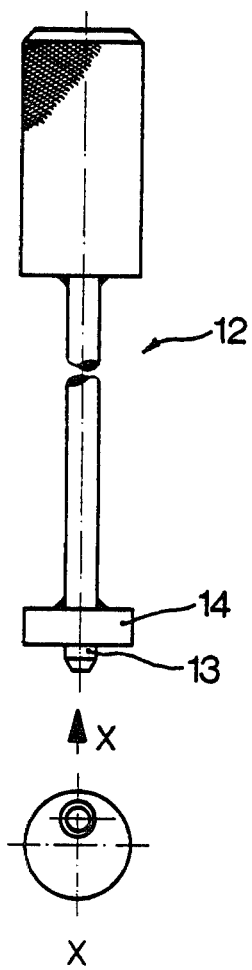
Figure 4:
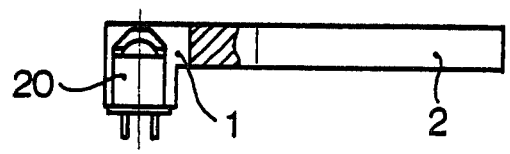
Figure 5:
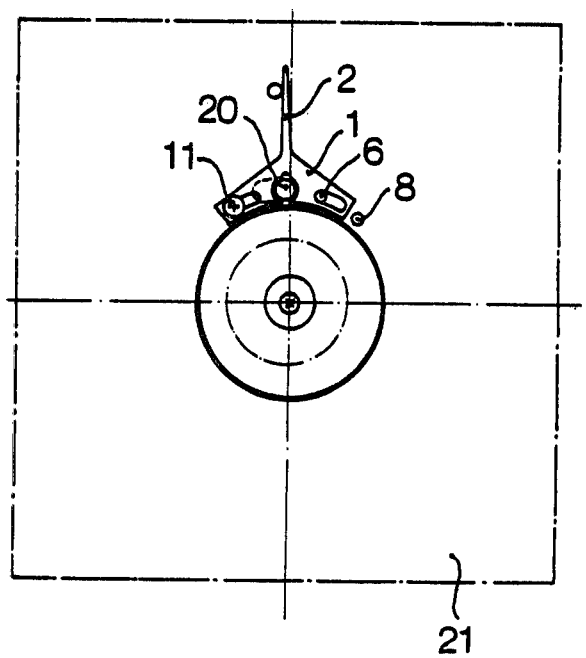
Figure 6:
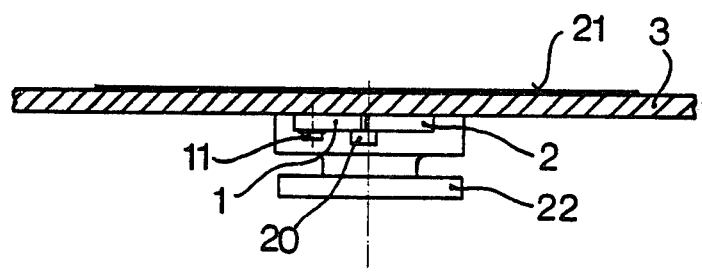

Further details of the invention are disclosed in the following description of the embodiments of the setting device illustrated in the accompanying drawings, in which FIG. 1 is a schematic plan view of the detecting means holder on the chassis of the recording/reproducing apparatus, in the unadjusted state, FIG. 2 shows the same view as in FIG. 1, with the holder clamped to the chassis in the adjusted state, also showing the eccentric adjustment tool without its handle, FIG. 3 shows a schematic broken side view of the eccentric adjustment tool and a schematic end view thereof, FIG. 4 is a schematic side view, partly in section, of the holder with the detecting means, FIG. 5 is a schematic bottom view of a recording disc in a square jacket on a recording/reproducing apparatus and a setting device of the invention, the chassis not being shown, and FIG. 6 is a side view, partly in section, of the arrangement shown in FIG. 5.

The holder for the detecting means, here a phototransistor 20, is an approximately T-shaped element made of, for example, a suitable plastics material such as polyoxymethylene, and consists of a holding member 1 proper and a spring 2. The spring 2 is preferably molded integrally with the holding member, but it can of course be replaced by a detachable or non-detachable spring of another type. The material chosen should have a good spring constant and a specific elasticity. The holder can be manufactured very economically by injection molding; however, it can naturally be manufactured in any other suitable manner, e.g. by machining.

The holding member 1 is provided with a slotted bore 1a in which the phototransistor is tightly held, and with elongated holes 1b and 1c on either side thereof. An elongated hole 4 is provided in the chassis 3 of the apparatus, below the holding member 1. It is also possible for the holding member 1 to have only one elongated hole if it is provided with an additional upwardly pointing projection (like the one shown in FIG. 4) which cooperates with the elongated hole 4 in the chassis 3. The chassis 3 is also provided with three lugs 5, 6 and 7 and a circular hole 8. Whereas lug 5 acts as an abutment for spring 2, lugs 6 and 7, which cooperate with elongated holes 1c and 1b respectively, serve as guide elements for holding member 1 when it is displaced, and also limit its travel. Lug 7 is advantageously provided with an inner thread 9. R designates the radial distance the index mark, usually a circular hole in the recording medium, is from the axis of rotation of the medium, R being a standard value in the case of floppy discs for example. As can be seen from FIGS. 1 and 2, the center of the retained phototransistor 20, the central lines of the elongated holes 1b, 1c and 4 and the center of the hole 8 lie on the circular path defined by R, i.e. the path along which the index mark moves when the magnetic disc rotates. As a result, the holding member can only move on the arc of the circle defined by R, and the phototransistor 20 can be precisely positioned and fixed relative to the index mark on the disc.

Apart from the production of the inner thread 9, no machining of the chassis is necessary, so that the chassis can be manufactured virtually completely by die-casting. Washer 10 and machine screw 11 serve to fix the device (cf. FIG. 2). The tools required for adjusting and fixing the device are for example a screwdriver and a screwdriverlike tool 12 (cf. FIGS. 2 and 3) which instead of a blade has a centering lug 13 and a circular member 14 arranged eccentrically thereto. The two tools are employed simultaneously during the adjustment operation, one tool in each hand. By turning tool 12, the centering lug 13 of which is inserted in the circular hole 8 in the chassis 3, the holding member 1 with the phototransistor is brought into the ideal position, held in this position and then fixed by tightening the machine screw 11 with the screwdriver. By turning tool 12 to the left or right, the holding member 1 can be moved exactly in either direction along the arcuate path defined by radius R; turning of the tool does not have to be effected with delicacy. It is of course also possible to use two screwdrivers.

FIGS. 5 and 6 show the position of the setting device of the invention relative to a recording disc 21 (a floppy disc) in a square jacket on a recording/reproducing apparatus of which the chassis 3 and part of the drive shaft 22 are shown.

We claim:

1. A device for adjusting and fixing an index-mark-detecting means relative to the index mark on a recording disc, which device is arranged on a recording/reproducing apparatus for the recording disc and comprises a holding device for a detecting means, the position of which can be altered and which can be aligned and fixed relative to the index mark on the disc, wherein the holding device for the detecting means is a slidably mounted member which has at least one elongated hole and is spring-loaded against the chassis of the apparatus, said member moving on an arcuate path defined by the curved line passing centrally through the elongated hole and the middle of the detecting means.

2. A device as claimed in claim 1, wherein the holding member is provided with two elongated holes which are arranged symmetrically with respect to the detecting means.

3. A device as claimed in claim 1 or 2, wherein the holding member is made of plastics material and is molded integrally with a spring in the form of an arm.

* * * * *